United States Patent
Frenger et al.

(10) Patent No.: US 9,763,106 B2
(45) Date of Patent: Sep. 12, 2017

(54) METHODS AND DEVICES FOR CELL RECONFIGURATION

(71) Applicant: Telefonaktiebolaget LM Ericsson (publ), Stockholm (SE)

(72) Inventors: Pål Frenger, Linköping (SE); Harald Kallin, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 52 days.

(21) Appl. No.: 14/907,463

(22) PCT Filed: Jul. 18, 2013

(86) PCT No.: PCT/SE2013/050916
§ 371 (c)(1),
(2) Date: Jan. 25, 2016

(87) PCT Pub. No.: WO2015/009211
PCT Pub. Date: Jan. 22, 2015

(65) Prior Publication Data
US 2016/0183099 A1    Jun. 23, 2016

(51) Int. Cl.
*H04W 16/24* (2009.01)
*H04W 52/02* (2009.01)

(52) U.S. Cl.
CPC ....... *H04W 16/24* (2013.01); *H04W 52/0206* (2013.01); *Y02B 60/50* (2013.01)

(58) Field of Classification Search
None
See application file for complete search history.

(56) References Cited

U.S. PATENT DOCUMENTS 6,181,276 B1 * 1/2001 Schlekewey .......... H04W 16/28
                                                    342/372
9,414,390 B2 * 8/2016 Kim .................... H04W 72/048
(Continued)

FOREIGN PATENT DOCUMENTS

| EP | 1799000 A2 | 6/2007 |
| WO | 0022859 A1 | 4/2000 |
| WO | 2012091639 A1 | 7/2012 |

OTHER PUBLICATIONS

Imran, Muhammad A. et al., "Deliverable D6.4 Final Integrated Concept", Energy Aware Radio and network Technologies (EARTH) INFSO-ICT-247733 EARTH https://bscw.ictearth.eu/pub/bscw.cgi/d49431/EARTH_WP6_D6.4.pdf., 1-95.
(Continued)

*Primary Examiner* — Hong Cho
(74) *Attorney, Agent, or Firm* — Murphy, Bilak & Homiller, PLLC

(57) ABSTRACT

Some embodiments provide a method for performing cell reconfiguration in a network node, which is associated with at least two antennas. Each antenna is capable of transmitting a signal covering at least one sector. The method comprises switching (1212) from a first state (1210) wherein a multi-sector cell covering at least two sectors is active, to a second state (1220), wherein sector cells covering each of the at least two sectors are active in addition to the multi-sector cell. In the second state, the same antennas are utilized for the sector cells as for the multi-sector cell. The method further comprises switching (1222) from the second state to a third state (1230) wherein the multi-sector cell is deactivated and the sector cells are active.

23 Claims, 17 Drawing Sheets

(56) References Cited

U.S. PATENT DOCUMENTS

| | | | | |
|---|---|---|---|---|
| 2008/0287163 A1* | 11/2008 | Skarby | ............. | H04W 88/08 |
| | | | | 455/562.1 |
| 2010/0151908 A1* | 6/2010 | Skarby | ............. | H04W 88/08 |
| | | | | 455/562.1 |
| 2013/0308473 A1* | 11/2013 | Sun | ............. | H04W 36/30 |
| | | | | 370/252 |

OTHER PUBLICATIONS

Hévizi, László G. et al., "Power Savings in Mobile Networks by Dynamic Base Station Sectorization", 2011 IEEE 22nd International Symposium on Personal, Indoor and Mobile Radio Communications, 2011, 2415-2417.

Skillermark, Per et al., "Enhancing Energy Efficiency in LTE with Antenna Muting", IEEE, 2012.

\* cited by examiner

Capacity mode (third state)

Antenna merging mode

Intermediate mode (second state)

Omni Tx (EE) mode (first state)

Multi-to-sector transition with shared power amplifier (PA)

Sector-to-multi transition with shared power amplifier (PA)

METHODS AND DEVICES FOR CELL RECONFIGURATION

TECHNICAL FIELD

The present invention relates generally to a method for performing cell reconfiguration in a network node, and to devices implementing such a method.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink and in the uplink, and is a next generation mobile communication system relative to UMTS.

In a wireless communications network, such as an LTE or UMTS network, radio access is provided to wireless devices by one or more radio base stations, also referred to herein as a "network node" or "radio network node". A base station is associated with one or more antennas which are used for the transmission and reception of one or more cells that are served by the base station. The base station and its associated antennas are sometimes referred to as a "base station site", "cell site", or simply "site" in the following. In the context of this disclosure, each cell is associated with a physical cell identity (PCI), which is at least locally unique, i.e. it is unique among the cells served by a certain base station and its neighbouring cells. The cell identity is broadcast within the cell, allowing wireless devices to identify the cell. In a typical, non-limiting scenario, a base station is associated with three sector antennas. In one configuration, each sector antenna forms a separate sector cell having a separate PCI. In an alternative configuration, all three antennas are utilized for transmitting a macro cell or "omni cell" having one single PCI. Intermediate configurations may exist, e.g. with one antenna transmitting a sector cell and the remaining two antennas transmitting a "multi-sector cell" covering two sectors. Throughout this disclosure, the term "multi-sector cell" or "multi-cell" will be used to refer to configurations where two or more sectors are merged into a single cell. It should be appreciated that the presence of a multi-sector cell does not exclude that additional sector cells, or even additional multi-sector cells, may be served by the same base station. The expression "omni cell" generally refers to a scenario where all sectors of a base station are merged into one cell. It should be appreciated that an omni cell is a special case of a multi-sector cell, and that examples and embodiments set forth herein referring to "omni cells" are also applicable more generally to multi-sector cells unless stated otherwise.

In a UMTS radio access network (RAN), the network node providing radio base station functionality is referred to as a NodeB. The NodeB is a logical node handling the transmission and reception of a set of cells. A Radio Network Controller (RNC) manages radio resources and provides control functionality for one or more NodeBs.

In an LTE RAN, the radio base station node is referred to as an eNodeB, and this node also handles the additional control functionality provided by the RNC in UMTS.

To meet the ever increasing demand for higher capacity in wireless networks, one approach is to deploy heterogeneous networks (HetNets), i.e. a network containing base stations operating with different transmission power. Base stations operating with high transmission power are commonly denoted macro base stations (or macro sites), and base stations operating with lower transmission power may be referred to as e.g. micro, pico, or femto base stations, or more generally as low power nodes. In such heterogeneous network deployments, the macro base stations can be said to form a "coverage layer", i.e. they provide a layer of macro cells having wide coverage areas. The low power nodes form a "capacity layer", i.e. a layer of smaller cells providing increased capacity in smaller areas within the macro cells, where high traffic levels are anticipated.

It is generally desirable to decrease energy consumption of radio access networks, both for environmental reasons and to save operational costs. Energy savings may be achieved at various different levels, e.g. by using more efficient components in the base stations, by improving the resource usage of individual radio links, or by improved network deployment strategies. Mechanisms for decreasing energy consumption have been considered in the Energy Aware Radio and neTwork tecHnologies (EARTH) project.

At a certain base station site, the radio resource need and the desired focus of network coverage may typically vary over time. Hence, some energy saving techniques are aimed at adapting to daily and local variations of traffic in various ways, for example by allowing a base station to go into sleep mode (discontinuous transmission, DTX) during idle periods. Another possibility is to completely deactivate certain cells or cell sites during a certain time period, while configuring other cells to take over the coverage. For instance, low power nodes such as pico cells might be turned off during off-peak hours.

A further way of reducing energy consumption based on traffic variations over time is to perform sector-to-omni cell reconfiguration within a base station site, as discussed in the EARTH deliverable D6.4, which is available electronically at https://bscw.ictearth.eu/pub/bscw.cgi/d49431/EARTH_WP6_D6.4.pdf. As described therein, in off-peak hours, one or more sectors may be switched off, and the antenna pattern of the remaining sector is changed to omni-directional to maintain coverage in the silent sector(s). The EARTH deliverable considers this as a slow energy saving method that operates on a time scale of approximately 12 hours. Typically, a site would be configured for omni coverage during night time and sector coverage during day time.

Multi-antenna techniques may be applied in UMTS as well as LTE in order to improve system performance. For example, Multiple-Input-Multiple-Output (MIMO) refers to the use of multiple antennas at both the transmitter and receiver side. Examples of different MIMO techniques are precoding (e.g. beamforming), spatial multiplexing, and transmit diversity. MIMO muting, or antenna muting, is an energy saving technique that is discussed in the EARTH deliverable mentioned above. The preferred method to enable antenna muting will be referred to as "antenna port merging" in the following disclosure. Antenna muting is considered to be a fast energy saving method applicable on e.g. a timescale of seconds. The idea is to activate or deactivate antennas based on the current amount of traffic. Thus, at low load, traffic can be handled by a single antenna and the other antennas are then muted. This may save energy because each antenna is usually served by a separate power amplifier. Antenna muting may be implemented in several ways. One possibility is to set the output power for the muted antenna ports to zero, i.e. no signals will be transmitted on these antenna ports. In a second (preferred) alternative, signals intended for all the antenna ports are added (i.e. the antenna ports are "merged") and then transmitted via one single physical antenna. In a third alternative, assuming a system with four transmit antennas, i.e. four antenna ports, the first and second antenna ports may be merged whereas no signal is transmitted on the third and fourth ports, i.e. the output power for the third and fourth ports are set to zero. Additional antennas may be activated as the load in the cell increases. The EARTH deliverable proposes applying fast antenna muting in relatively dense deployed networks with good coverage.

SUMMARY

An object of some embodiments is to enable fast and reliable cell reconfiguration in a network node.

A further object of some embodiments is to reduce energy consumption at the site level in cellular networks.

Some embodiments provide a method for performing cell reconfiguration in a network node. The network node is associated with at least two antennas, and each antenna is capable of transmitting a signal covering at least one sector. The method comprises switching from a first state wherein a multi-sector cell covering at least two sectors is active, to a second state, wherein sector cells covering each of the at least two sectors are active in addition to the multi-sector cell. In the second state, the same antennas are utilized for the sector cells as for the multi-sector cell. The method further comprises switching from the second state to a third state wherein the multi-sector cell is deactivated and the sector cells are active.

Other embodiments provide a network node associated with at least two antennas, wherein each antenna is capable of transmitting a signal covering at least one sector. The network node comprises transmitting circuitry, a processor, and a memory. The network node is connectable to baseband circuitry configured to generate baseband signals corresponding to one or more cells. The memory contains instructions executable by the processor whereby the network node is operative to switch from a first state wherein a multi-sector cell covering at least two sectors is active, to a second state, wherein sector cells covering each of the at least two sectors are active in addition to the multi-sector cell. In the second state, the network node is operable to utilize the same antennas for the sector cells as for the multi-sector cell. The network node is further operable to switch from the second state to a third state wherein the multi-sector cell is deactivated and the sector cells are active.

Yet further embodiments provide a network node associated with at least two antennas, wherein each antenna is capable of transmitting a signal covering at least one sector. The network node comprising means adapted to switch from a first state wherein a multi-sector cell covering at least two sectors is active, to a second state, wherein sector cells covering each of the at least two sectors are active in addition to the multi-sector cell, and wherein the same antennas are utilized for the sector cells as for the multi-sector cell. The network node further comprises means adapted to switch from the second state to a third state wherein the multi-sector cell is deactivated and the sector cells are active.

An advantage of some embodiments is that site reconfiguration between a sector cell state and a multi-cell state may be performed without disturbing ongoing traffic associated with active connections within the cells. Specifically, reconfiguration may be performed without any radio link failures. This advantage is enabled by introducing an intermediate state where the sector cells and the multi-cell are active simultaneously, and utilizing the same antennas. Since ongoing traffic is not disturbed, reconfiguration from sector cells to multi cell may be performed more frequently, e.g. on a time scale of seconds instead of several hours. Hence, the potential gain of performing such reconfiguration is significantly increased, as it becomes possible to operate in an energy optimized mode during a larger percentage of time.

A further advantage of some embodiments is reduced energy consumption at low load. This is made possible, in these embodiments, by utilizing fewer power amplifiers for the multi-cell than for the sector cells covering the same area as the multi-cell.

Further benefits of various embodiments are:
  Cell neighbor relation lists are not affected since no cell changes shape.
  The combined site coverage area is only marginally affected in the DL and not at all in the UL.

DETAILED DESCRIPTION

As described above, sector-to-omni reconfiguration is a promising method for reducing RBS energy consumption at low load. However, prior art reconfiguration methods are associated with drawbacks, such as:
  Ongoing traffic will be disturbed in case sector-cells are removed;
  Cell neighbor relations will change in case the sector-cell coverage is changed; and
  Utilizing different antennas (and/or very different spectrum) for sector-cells and omni-cells results in different coverage, and poor utilization of spectrum at high loads.

With currently known technology, sector-omni reconfiguration is thus an energy saving method with significant disadvantages. The cost of switching between a sector covering mode and an omni covering mode limits the frequency of which the algorithm may be allowed to execute in a live network node.

Throughout this disclosure, the term "antenna" refers to a physical antenna and the term "antenna port" refers to a physical antenna port. An antenna may comprise more than one antenna elements, for example two cross-polarized elements. Other configurations are also possible, such as four-element or eight-element antennas. Each antenna is associated with one or more antenna ports, controlling different antenna elements where applicable.

Figure 1:
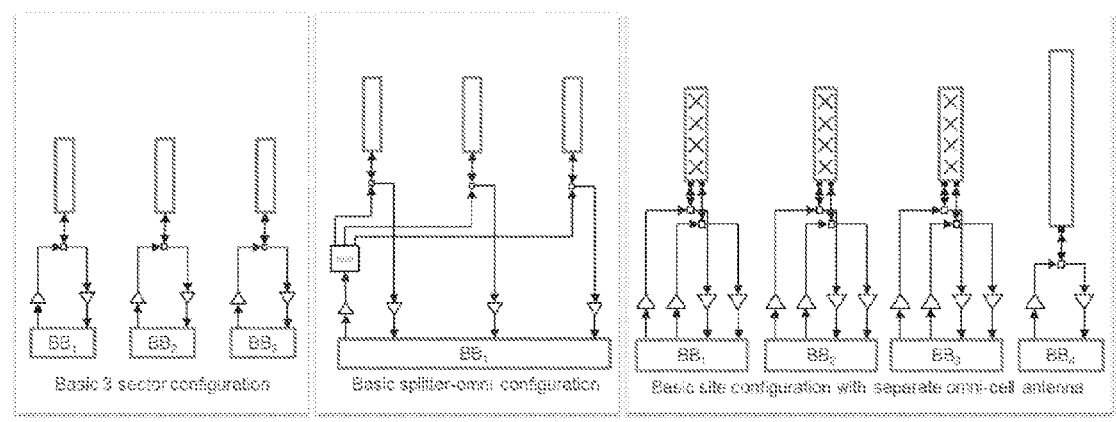
FIGS. 1-10 are schematic block diagrams illustrating transmitting circuitry.

Some reference site configurations are shown in FIG. 1. Note that these are all more or less static configurations. It is possible to switch between e.g. a basic three-sector configuration and a basic splitter-omni configuration, but such reconfiguration has several drawbacks, as explained above.

Hence, the present disclosure provides, according to some embodiments, a dynamic radio base station reconfiguration method of switching between a sector-configuration and an omni-configuration. An exemplary radio base station (RBS) is equipped with N sector cells and one additional omni cell, all with their own unique physical cell identities (PCIs). It should be noted that the PCIs are not necessarily unique within the entire network, but should at least be locally unique. That is to say, the PCI of a cell should not be used by any of its neighbouring cells. Stated differently, the PCI:s for different cells should be selected such that no UE can be confused by receiving the same PCI value from two cells at the same time. The omni cell is utilizing the same physical antennas as the sector cells and said RBS alternates between at least three different states: a first state where only the sector cells are active; a second intermediate state where all cells are active; and a third state where only the omni-cell is active.

In a further embodiment the omni cell utilizes the same power amplifiers as the sector cells. By first adding the omni cell in the base-band domain, the active users may be handed over to the omni cell and the sector cell may be safely put to dormant mode. Subsequently, the site uses at least N power amplifiers (PAs) to transmit the omni cell. So far, no energy reduction has been enabled. The next step, however, is reconfigure the omni cell from being inserted in the low-power domain (before the power amplifiers) to be split up in at least N identical signals in the high power domain after the power amplifiers. It is advantageous to perform this step as quickly as possible. The reconfiguration enables transmission of the omni cell from only one power amplifier. The remaining at least N−1 power amplifiers may now be turned off in order to reduce energy consumption. To compensate for the splitter, the gain of the remaining power amplifier may be increased, preferably by at least a factor of N. It may be noted here that even though the gain of the remaining power amplifier is increased, a reduction in the total energy consumption is still achieved, because each active power amplifier consumes a certain amount of power even when idle. Hence, it is more energy efficient to run a single PA at N times the gain, than running N power amplifiers at normal gain.

The reconfiguration of the omni cell from a 3 PA to a 1 PA configuration will not affect the remaining active UEs. If done in a perfectly phase coherent way, the reconfiguration will not affect the signal transmitted over the air. If no such phase coherence can be achieved, the RF signal will experience a sudden phase jump, but this will not affect the ongoing communications in any significant way.

In a yet further embodiment the dynamic sector-omni reconfiguration method is combined with antenna muting. In case the omni cell is utilizing PAs that are already muted in the sector cells, this relaxes the requirements on the power amplifiers. In case a power amplifier needs to transmit signals from two cells during the intermediate second phase, more power is required. Especially when switching back from an omni-configuration to a sector configuration, this might be a problem if we assume that the omni cell may at that point already be carrying a significant amount of traffic.

Figure 2:
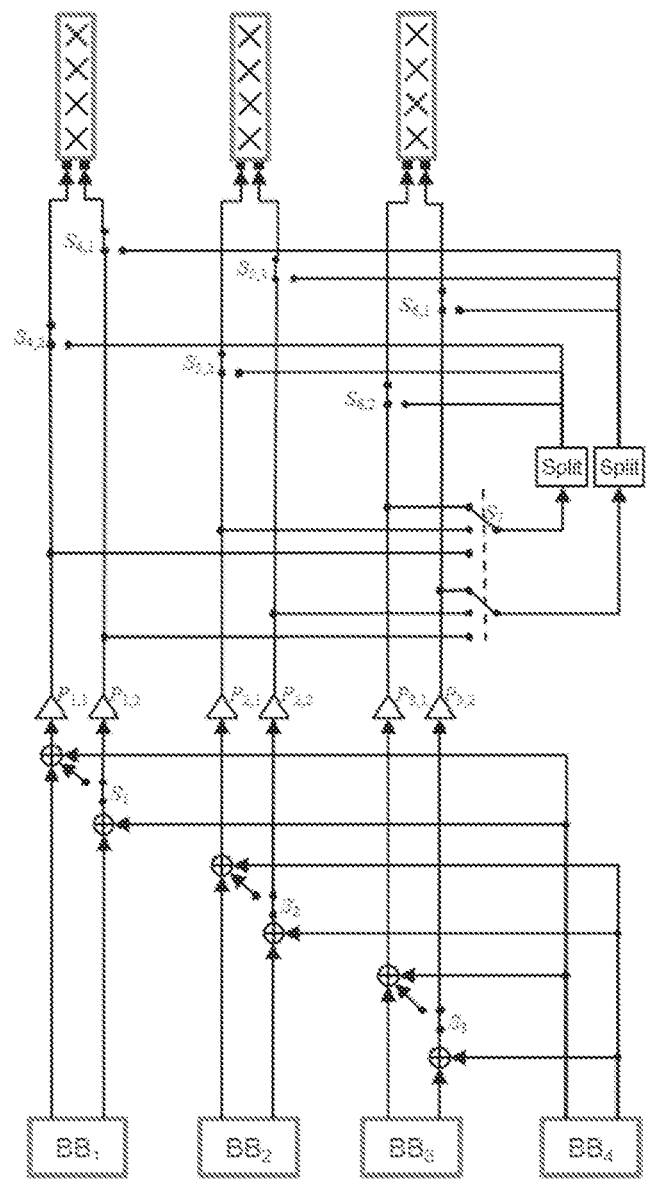
Figure 3:
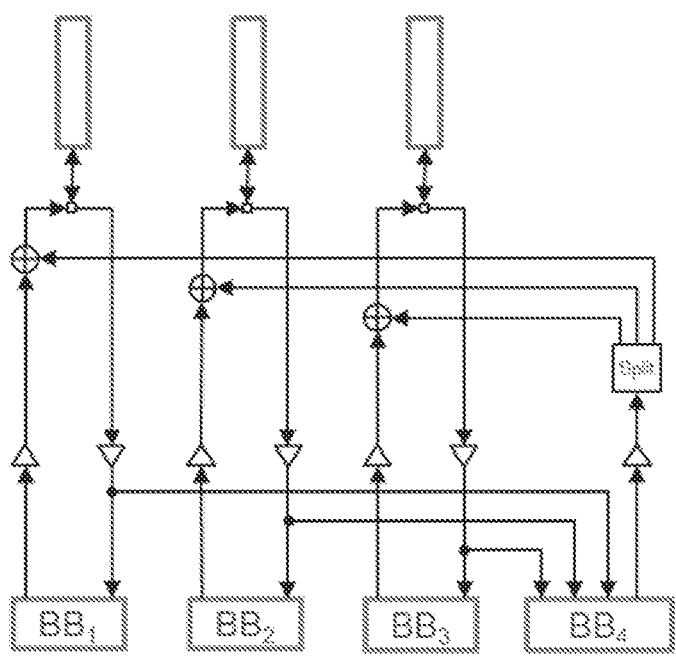

FIG. 2 illustrates an embodiment where the omni cell uses the same PAs as the sector cells, and where antenna muting may be applied. FIG. 3 illustrates another embodiment where the omni cell uses a separate PA.

According to an example embodiment, the steps of switching from a capacity optimized state, where sector cells are transmitted, to an energy optimized state (EE) where an omni cell is transmitted, will now be described with reference to FIG. 4. In this example, for the purpose of illustration and not limitation, we will assume that LTE is used and that the site has 3 sector cells and 1 omni cell.

Procedure: Capacity Mode to EE Mode

Step 1: Antenna port merging. By using the switches $S_1$, $S_2$, and $S_3$ the site is operating in an antenna merging mode. This is an optional step which applies in particular to LTE Rel-8. When antenna merging is applied, the omni cell may advantageously utilize a PA that is currently unused by any sector cell. This relaxes the PA requirements, in particular when switching from an energy optimized mode to a capacity mode. During this transition phase the traffic load may be significant, and hence using separate PAs for the omni-cell and the sector cells during this time is beneficial.

Step 2: Add the omni cell in the base-band (or low-power RF) domain. By using switch $S_4$ the omni cell is added on top of the low-power signals associated with the sector cells. Stated differently, the omni cell is added before the PA stage.

During this intermediate step, it is possible, as an optional step, to safely move ongoing traffic from the sector cells to the omni-cell. The sector cells may be set in a cell-barred state in order to prevent new UEs from trying to access them. However, this is not necessary as this step does not take long to perform. Preferably, the power settings of the cells may be changed so that the UEs are induced to perform a handover to the omni cell. Alternatively, the base station may directly order the UEs to handover to the omni cell.

The power of the sector cells may be reduced and the power of the omni cell may be increased, e.g. by using a power ramping procedure. It is also possible to forego power ramping and simply set the power levels relative to each other such that the power of the omni cell will exceed the power of the sector cells by at least a handover threshold.

Optionally, neighboring cells are informed, via X2 signaling as specified in the LTE standard, that the omni-cell is now in active mode.

Step 3: Deactivate sector cells. Once there is no more active traffic in the sector cells, the base-band downlink signals from cells 1, 2, and 3 (denoted $BB_1$, $BB_2$, and $BB_3$ in FIG. 4) no longer need to be transmitted. This enables the PAs $P_{1,1}$, $P_{2,1}$ and $P_{3,1}$ to be deactivated. Optionally, the baseband circuitry for the downlink for cells 1, 2, and 3 may also be deactivated, for further power savings. As a further option, neighboring cells are informed that the sector cells are now in dormant mode.

Step 4: Switch omni cell from 3 PAs to 1 PA: By using the switches $S_5$, $S_6$, and $S_7$ a signal splitter on the high power RF domain is inserted. The omni cell is in this example only using the PA $P_{3,2}$. Hence, the PAs $P_{1,2}$ and $P_{2,2}$ may now be de-activated. To compensate for the fact that the omni cell signal now passes through a signal splitter after the PA, the gain of the remaining PA $P_{3,2}$ may be increased by at least a factor of 3.

Step 5: Optionally, the omni-cell may be configured with 6 MBSFN sub-frames in order to maximize the use of cell DTX.

Procedure: EE Mode to Capacity Mode

The reverse procedure is analogous and will be described below with reference to the previous embodiment.

Step 1: Configure Omni-cell with 0 MBSFN sub-frames (optional)

Step 2: Switch omni-cell from 1 PA to 3 PAs. This comprises:

Switching $S_5$, $S_6$, and $S_7$
Decreasing $P_{3,2}$ to normal gain
Activating PAs $P_{1,2}$ and $P_{2,2}$
Step 3: Activate the sector cells. This involves:
Activating PAs $P_{1,1}$, $P_{2,1}$ and $P_{3,1}$
Activating DL signals from $BB_1$, $BB_2$, and $BB_3$
Optionally, handing over active UEs to sector cells
Optionally, putting the omni-cell in a "cell barred state"
Optionally, informing neighboring cells via X2 signaling that the sector cells are active.
Step 4: Remove omni-cell from base-band domain, by switching $S_4$.
Step 5: Antenna port activation, by switching $S_1$, $S_2$, and $S_3$.

FIG. 6 to FIG. 10 illustrate different operational states used by an example RBS that implements the methods described above.

Figure 5:
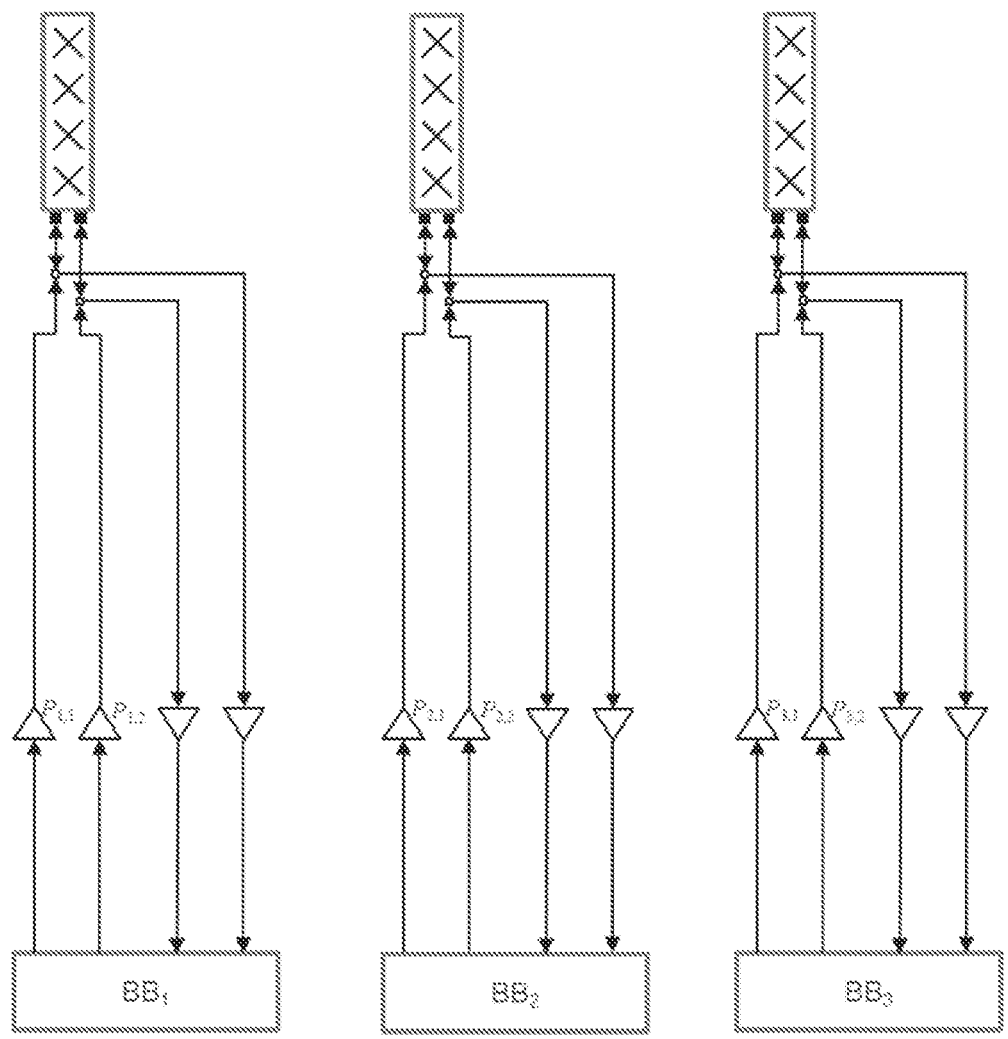
Figure 6:
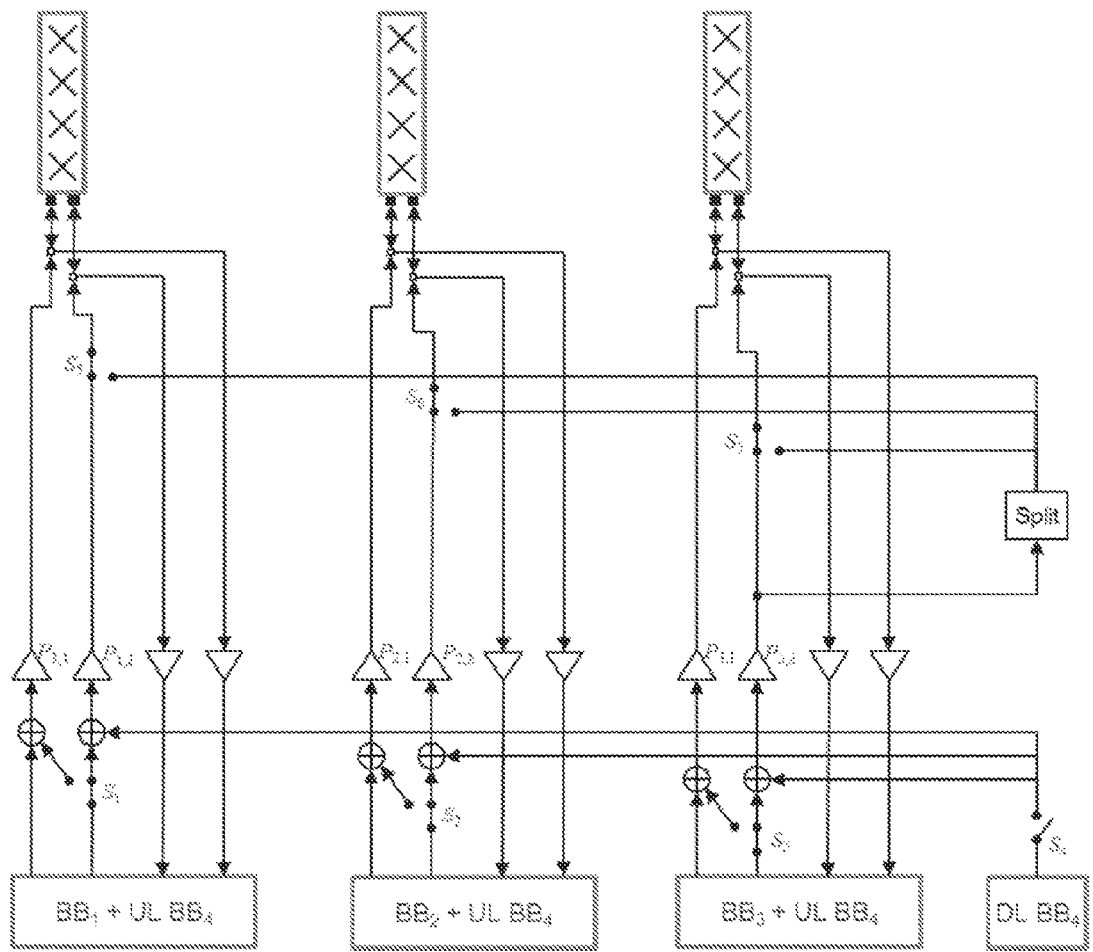
Figure 7:
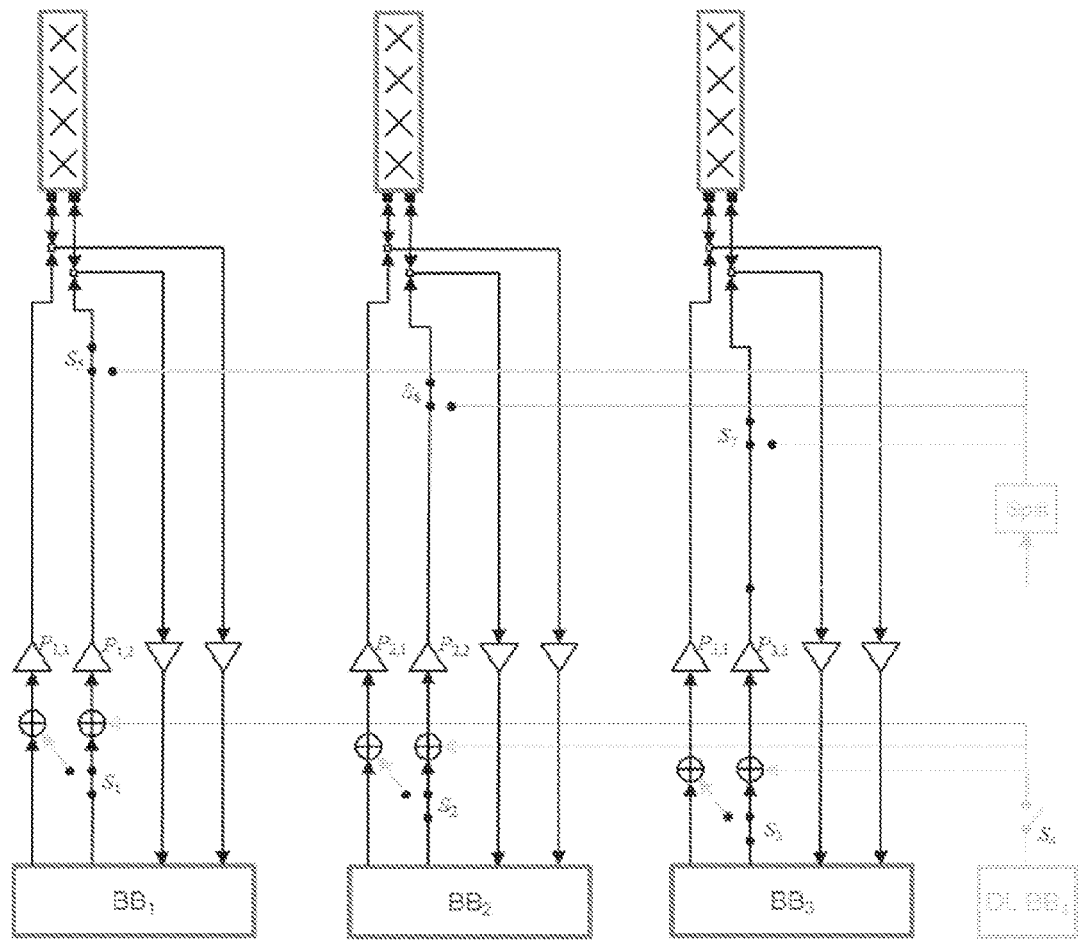
Figure 8:
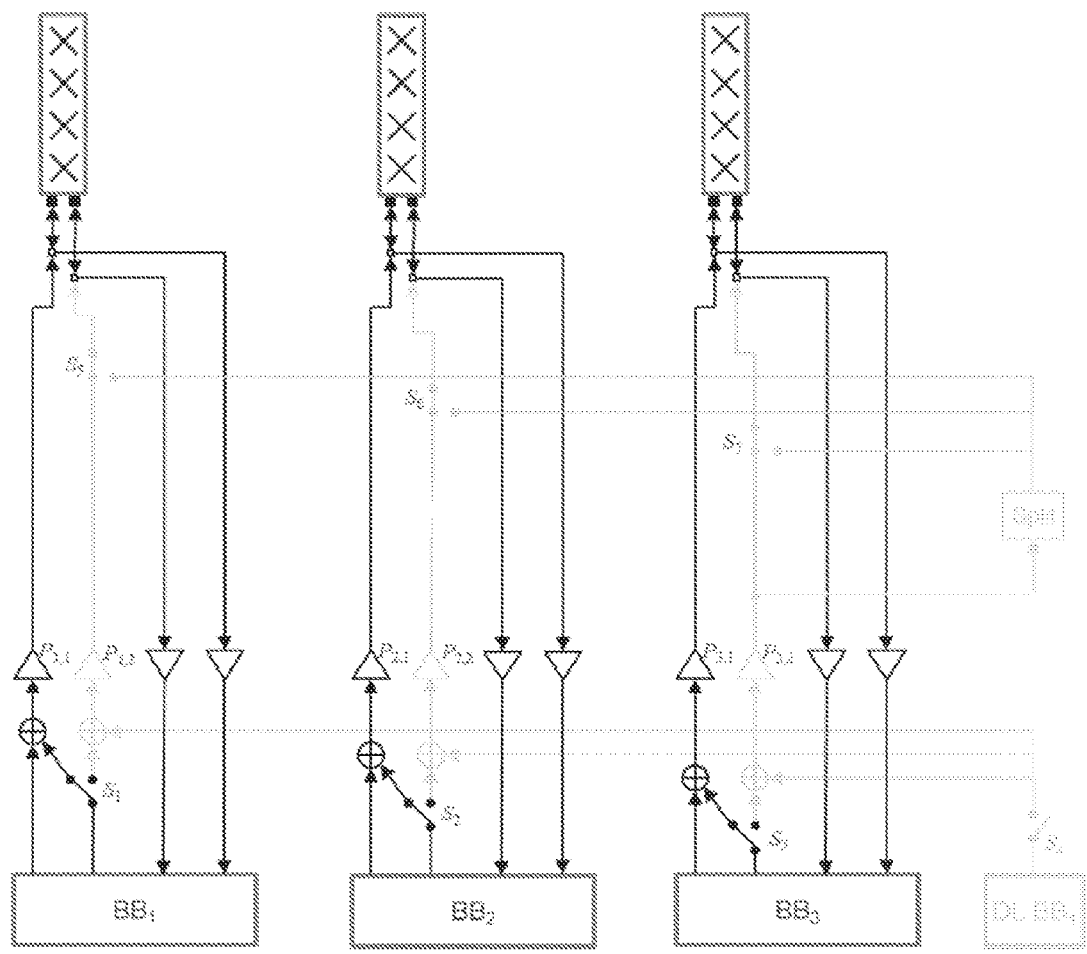
Figure 9:
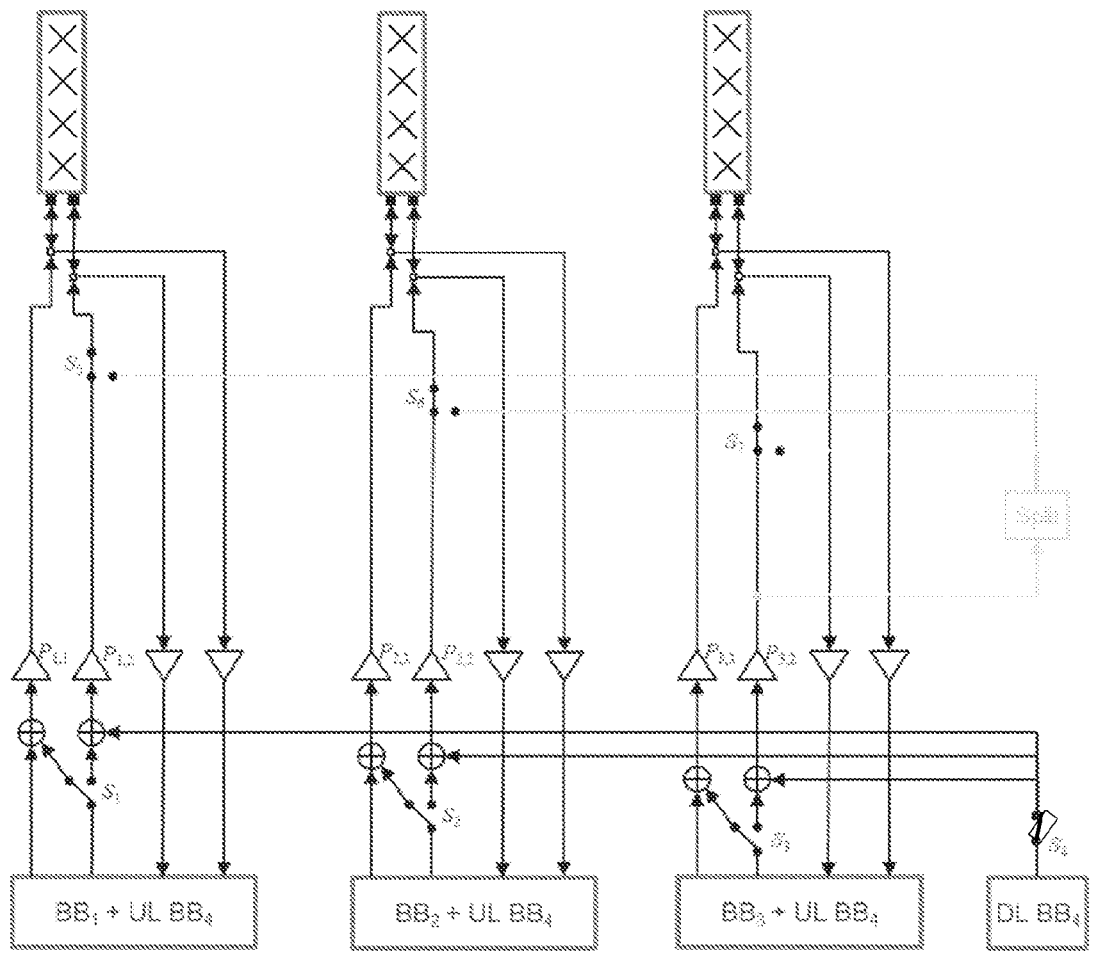
Figure 10:
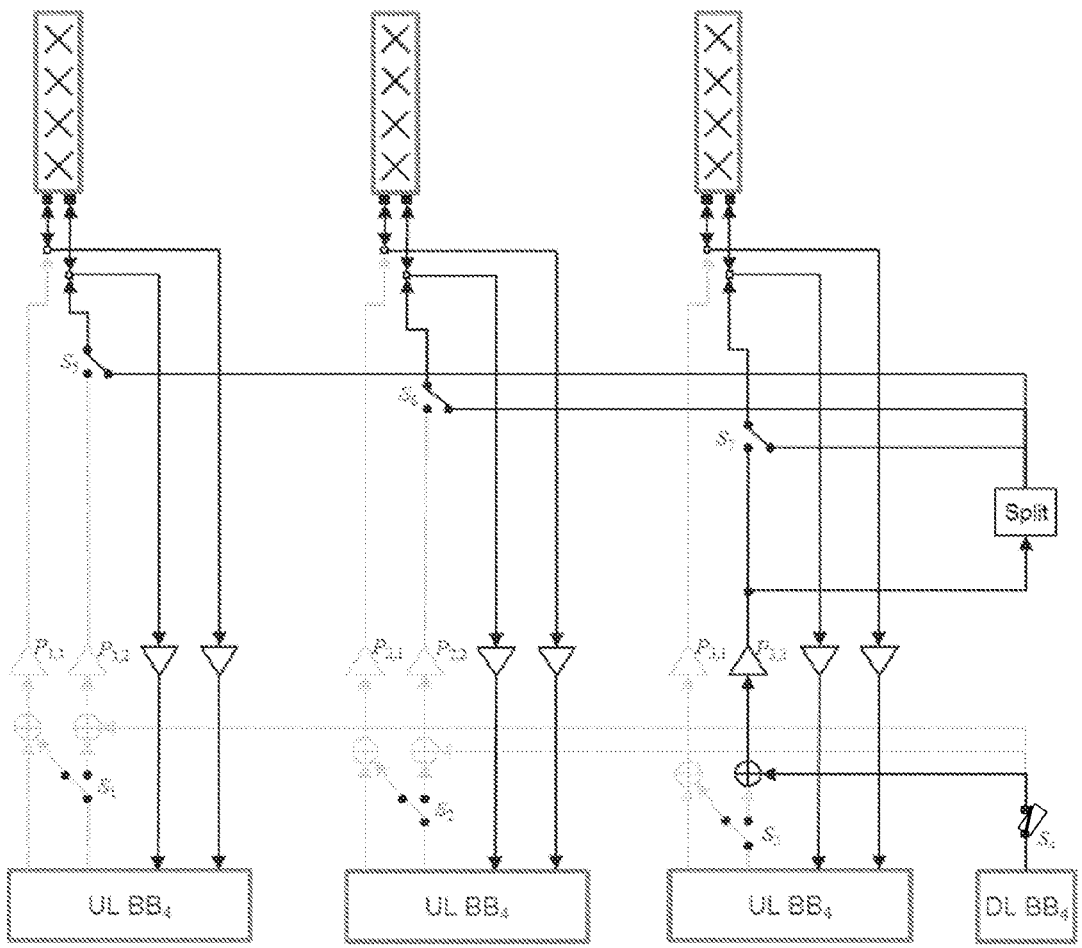

FIG. 5 shows a base-line reference implementation. FIG. 6 also illustrates baseband circuitry for the uplink, and shows a possible way of implementing the disclosed methods by introducing an additional cell, and by introducing switches and signal splitters on both sides of the power-amplifiers normally used by the sector cells. FIG. 7 depicts the capacity mode of the embodiments described above, where the sector cells are active and the omni cell is dormant. FIG. 8 depicts the antenna merging mode. FIG. 9 shows an intermediate mode where the omni cell and the sector cells are active simultaneously. In this example the omni cell utilizes the power amplifiers already muted by the antenna merging operation. FIG. 10 depicts the energy optimized mode where the omni cell signal is split in the high power RF domain.

It may be noted that according to the embodiments described above, positioning reference signals may not be transmitted in sector coverage, since that would require activation of the sector PAs every time a positioning reference signal is scheduled for transmission. Instead, the positioning signal may be transmitted in an omni cell configuration, even when the omni cell is in dormant mode and the sector cells are in active mode. Note that this does not result in any reduction of positioning accuracy in positioning methods that measure the time-difference of arrival between positioning reference signals.

Note also that the omni cell may be using a 2TX configuration and use antenna merging (as in FIG. 2). Alternatively, the omni cell may always use a 1TX configuration (as in FIG. 6). This will mainly impact the downlink control channel performance. In small-to-medium size cells the downlink control channel performance with 1TX may be sufficient while in larger cells a 2 TX configuration may be beneficial also for the omni cell.

Some further embodiments will now be described, mainly focusing on reconfiguration from a multi-sector cell state to a sector cell state. Such reconfiguration may be initiated based on certain trigger conditions being preconfigured in the network node, or based on other criteria such as a time schedule.

It should be recalled that "multi-sector cell" refers to a cell covering at least two sectors. An omni cell, which covers all sectors of the RBS, is thus a special case of a multi-sector cell. It is emphasized that the embodiments described herein which, for purposes of illustration, refer to an omni cell, are equally applicable to the more general case of multi-cell to sector cell reconfiguration, the difference being that in the multi-cell case, the site may have additional sector cells or multi cells, or the multi-cell configuration may change over time—for example, the multi-cell may comprise different sector cells depending on e.g. traffic load.

Figure 11A:
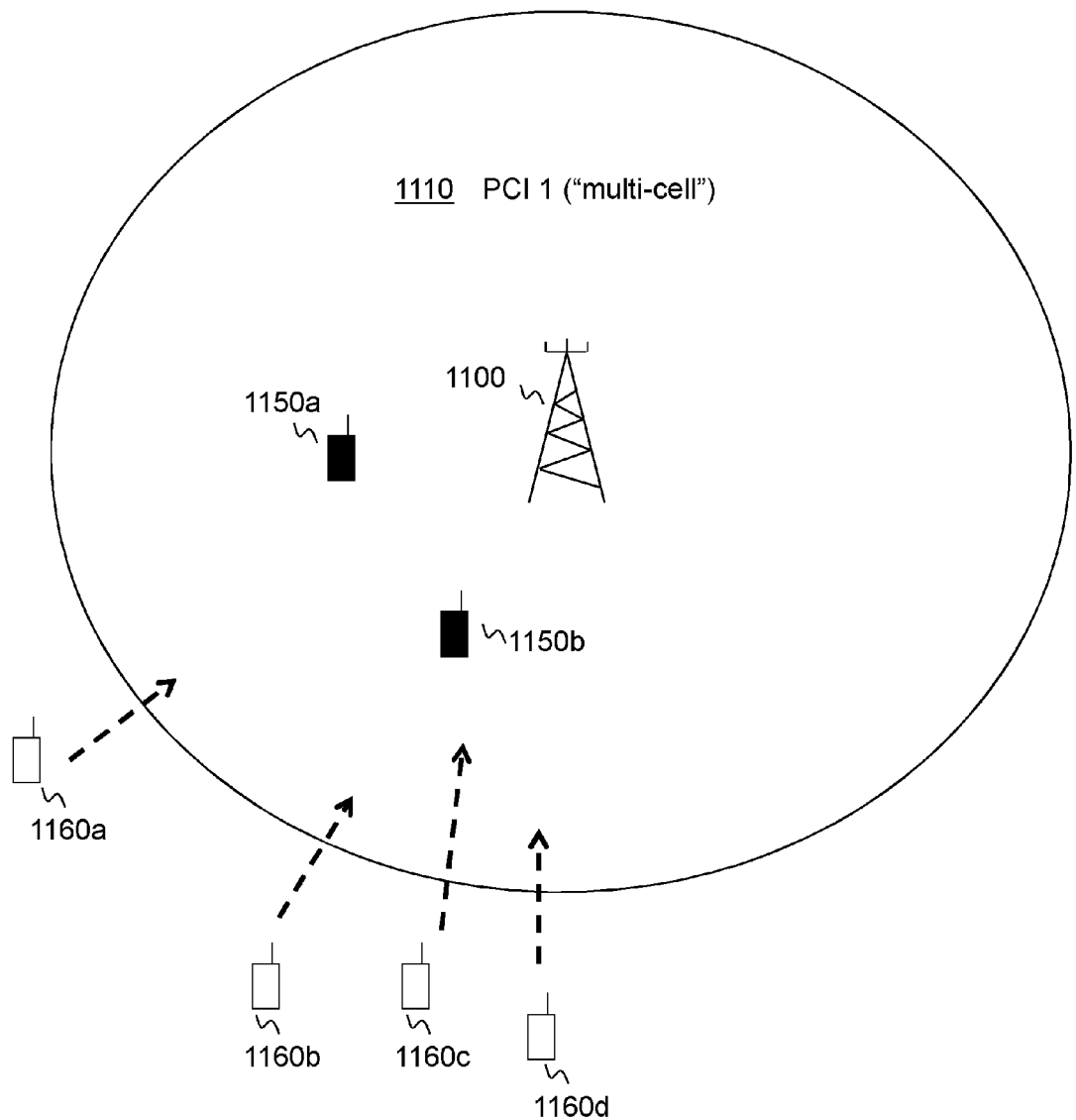
FIG. 11a-c are schematic drawings illustrating a scenario in which some embodiments may operate.
Figure 11B:
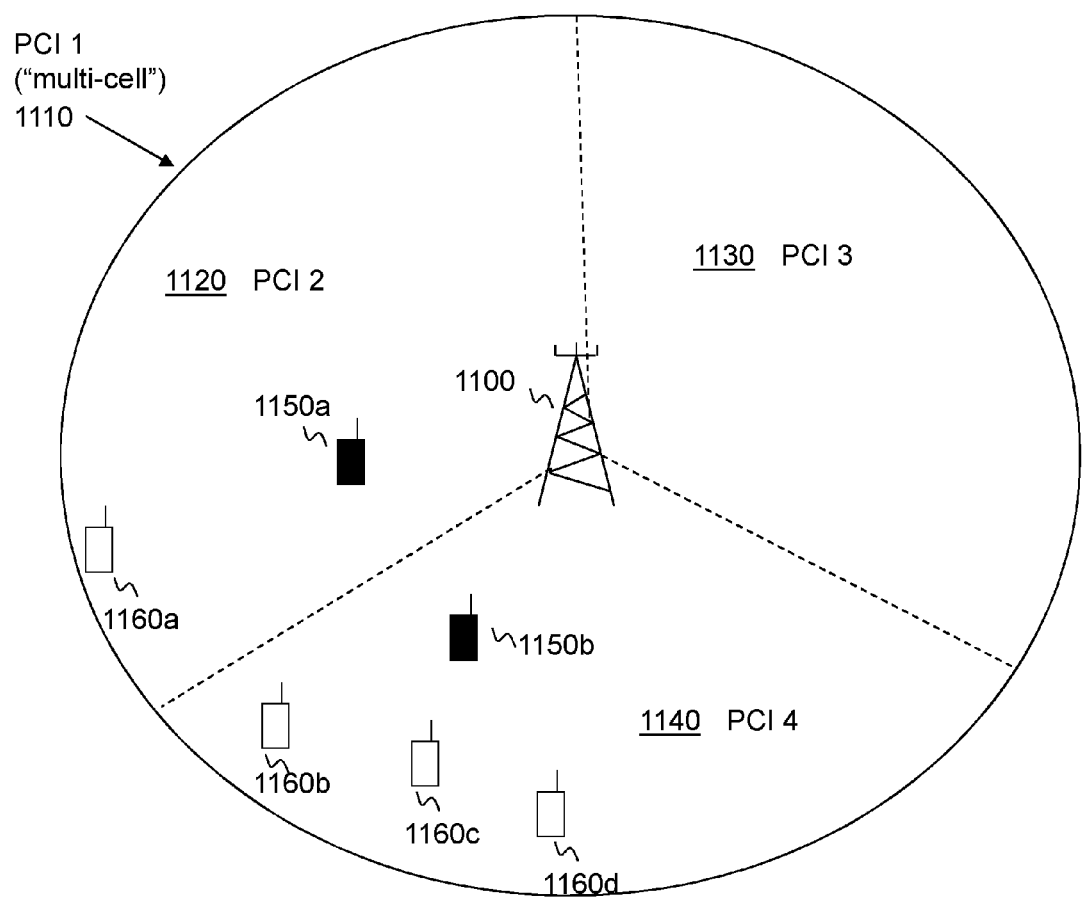
Figure 11C:
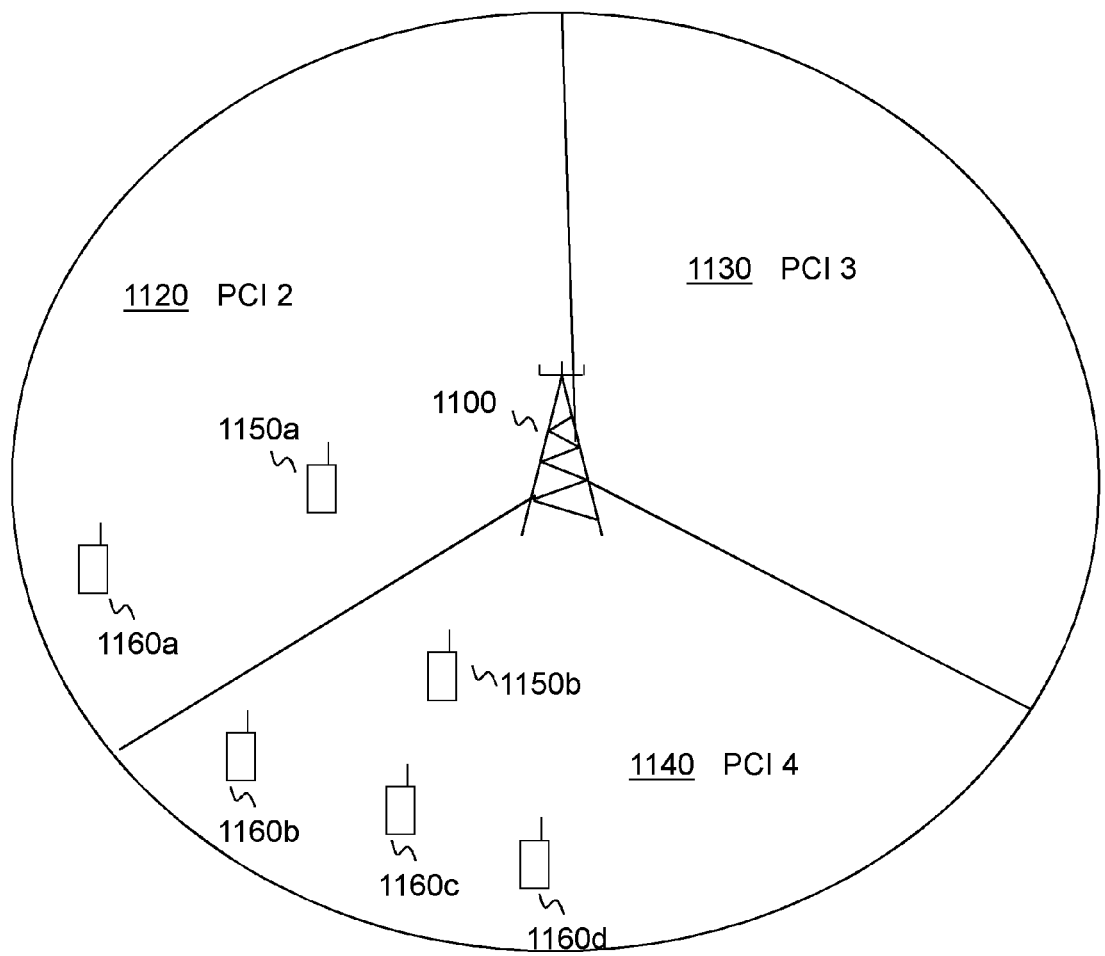
Figure 12:
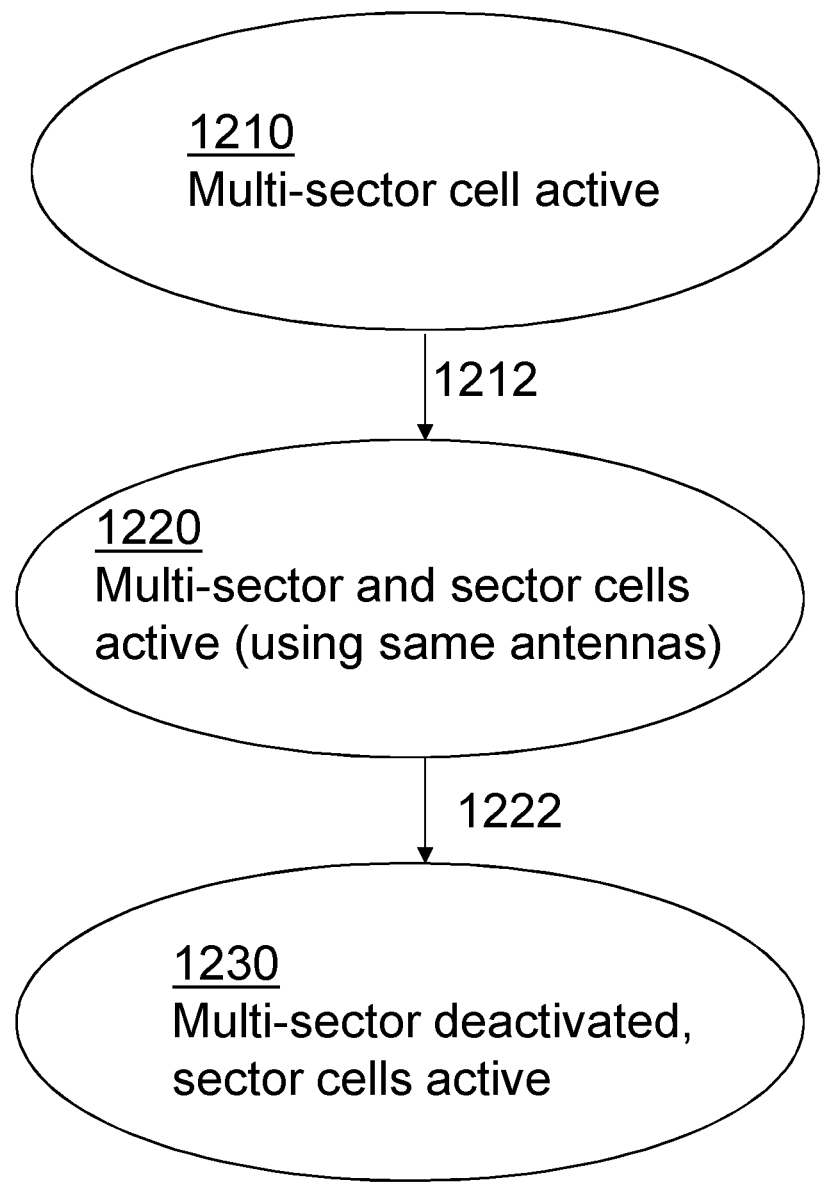
FIG. 12 illustrate state transitions according to some embodiments.
Figure 13:
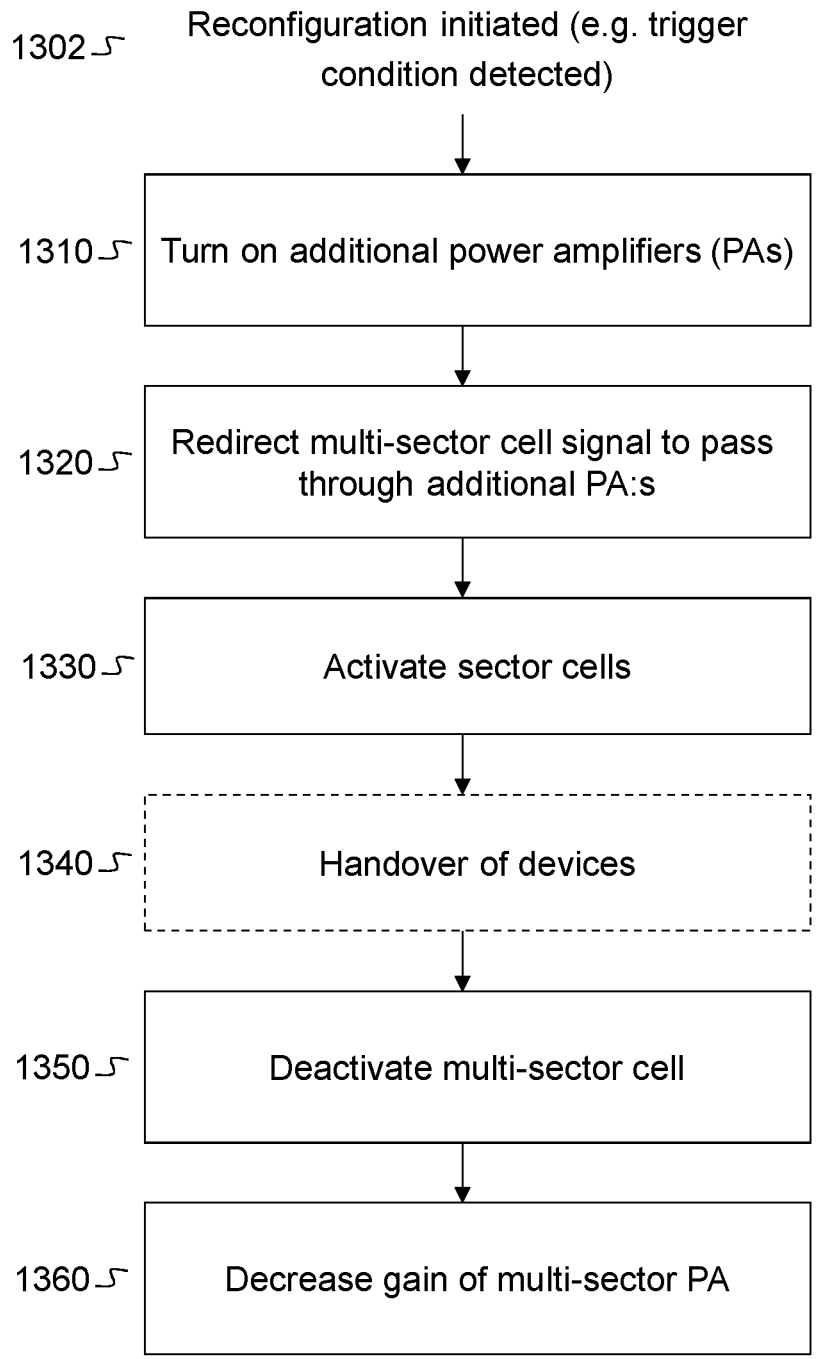
FIG. 13 is a flow chart illustrating a method according to some embodiments.

An example method for performing cell reconfiguration in a network node will now be described, with reference to the flow chart in FIG. 13, as well as the scenario shown in FIGS. 11a-c and the state transition diagram of FIG. 12. FIGS. 11a-c illustrates an example network in a first, second and third state, respectively. FIG. 12 is a state transition diagram showing switching between the three states.

The network node, exemplified by network node 1100 in FIG. 11a-c, is associated with at least two antennas. The network node 1100 may be embodied as a NodeB, an eNodeB, or another suitable type of base station. Each antenna is capable of transmitting a signal covering at least one sector 1120, 1130, 1140.

Initially, the network node 1100 is in a first state 1210 wherein the multi-sector cell 1110 is active. The multi-cell state is illustrated in FIG. 11a. As seen, the multi-cell 1110 covers sectors 1120, 1130 and 1140 (shown in FIGS. 11b-c), but the sector cells 1120, 1130 and 1140 are deactivated in the first state. Here, "active" implies that network node 1100 is transmitting a signal corresponding to the cell, e.g. comprising system information such as PCI, and that wireless devices may be served by the cell. In contrast, a cell being "deactivated" implies that the network node 1100 is not transmitting any signals corresponding to the cell, such as system information, such that the cell is not detectable or available to serve any wireless devices.

It is pointed out that, although in this particular example the multi-cell 1110 is an omni cell covering all three sectors 1120, 1130, 1140, the method is equally applicable to a multi-cell covering two sectors, or more generally to a multi-cell covering two or more sectors.

In the present example, each cell (the multi-sector cell as well as the sector cells) is associated with a physical cell identity which is unique within the network node 1100 as well as within other nodes (not shown) having a neighbor relation to the network node 1100.

Two wireless devices, e.g. LTE user equipments, 1150a and 1150b are served by the multi-cell 1110. A further four wireless devices 1160a-d are currently outside the coverage area of the network node 1100, but are currently moving toward it as illustrated by the dashed arrows. The presence of the additional devices 1160a-d will increase the load in multi-cell 1110 to such an extent that a sector cell configuration would be preferable.

Optionally, the network node 1100 detects 1302 a trigger condition for initiating reconfiguration, e.g. a high load in the multi-sector cell. For example, the network node 1100 may detect that the cell load exceeds a preconfigured threshold value for initiating reconfiguration to a sector cell state.

Alternatively, the network node 1100, instead of detecting high load, receives an indication to perform reconfiguration from another network node, e.g. a neighboring base station or a centralized node, such as an RNC or OSS node. The indication could e.g. comprise a message from the neighboring network node(s) serving the devices 1160a-d, informing the network node 1100 in advance of the incoming traffic. This would enable the network node 1100 to initiate reconfiguration to a sector cell state before the wireless devices 1160a-d actually enter its coverage area.

It should further be noted that the cell reconfiguration could also be initiated based on other criteria, such as a fixed time schedule, and is thus not necessarily dependent on the occurrence of actual increased traffic in the cell. In such variants, the time schedule may be hardcoded in the network node 1100, or scheduling information might be received from another network node.

The network node 1100 now activates the three sector cells 1120, 1130, and 1140. Optionally, the multi-sector cell 1110 is also set in cell barred state at this time, so that any further wireless devices entering the coverage area of network node 1100 will be served by one of the sector cells.

Network node 1100 thus switches to a second intermediate state 1220, where both the multi-cell 1110, and the three sector cells 1120, 1130, 1140 are active. The second state is illustrated in FIG. 11*b*.

In the second state, the same antennas are utilized for the sector cells as for the multi-sector cell, hence maintaining the same coverage throughout the reconfiguration process.

As shown in FIG. 11*b*, wireless devices 1160*a-d* have moved inside the coverage area of network node 1100 and are served by the sector cells (although as explained above, this is not a necessary condition as reconfiguration can be triggered by other means than increased traffic). Specifically, wireless device 1160*a* is served by sector cell 1120 and devices 1160*b-d* are served by sector cell 1140.

Note that if the multi-sector cell 1110 had not been set in cell barred state, the wireless devices 1160*a-d* might initially be served by the multi-sector cell 1110.

At this point, wireless devices 1150*a-b* are still being served by the multi-sector cell. Handover of the devices 1150*a-b* may now be initiated, for example by sending a direct handover command to these devices, or by adjusting the transmit power level of the multi-sector cell with respect to the sector cells such that the wireless devices 1150*a-b* will detect the sector cells as sufficiently stronger and send a handover request to the network node 1100. In other words, the transmit power of either the multi-cell or one or more of the sector cells, or both, may be adjusted such that the difference between the signal strength of at least one of the sector cells and the signal strength of the multi-sector cell exceeds a handover threshold.

Finally, the network node 1100 switches 1222 from the second state to a third state 1230, wherein the multi-sector cell is deactivated and the sector cells 1120, 1130 and 1140 are active. The third state is shown in FIG. 11*c*. Hence, devices 1150*a* and 1160*a* are served by sector cell 1120, and devices 1150*b* and 1160*b-d* are served by sector cell 1140.

As seen from the above example, by introducing an intermediate state where the multi-cell and the sector cells are simultaneously active, and using the same antennas, a seamless reconfiguration without loss of traffic may be achieved. As explained above, this makes it possible to perform reconfiguration between the multi-cell and sector cell states very frequently due to the smooth, loss-less, transition between states.

A variant of this embodiment will now be described, wherein energy savings is achieved by using fewer power amplifiers in the first state than in the second and third states. In other words, energy savings is achieved when in the multi-cell state. The state transitions and various options described above apply also in this variant. FIG. 4 exemplifies one possible way of implementing this variant in the network node 1100. Referring to FIG. 4, the multi-cell signal would be generated by $BB_4$, and the sector cell signals generated by $BB_1$-$BB_3$.

Figure 4:
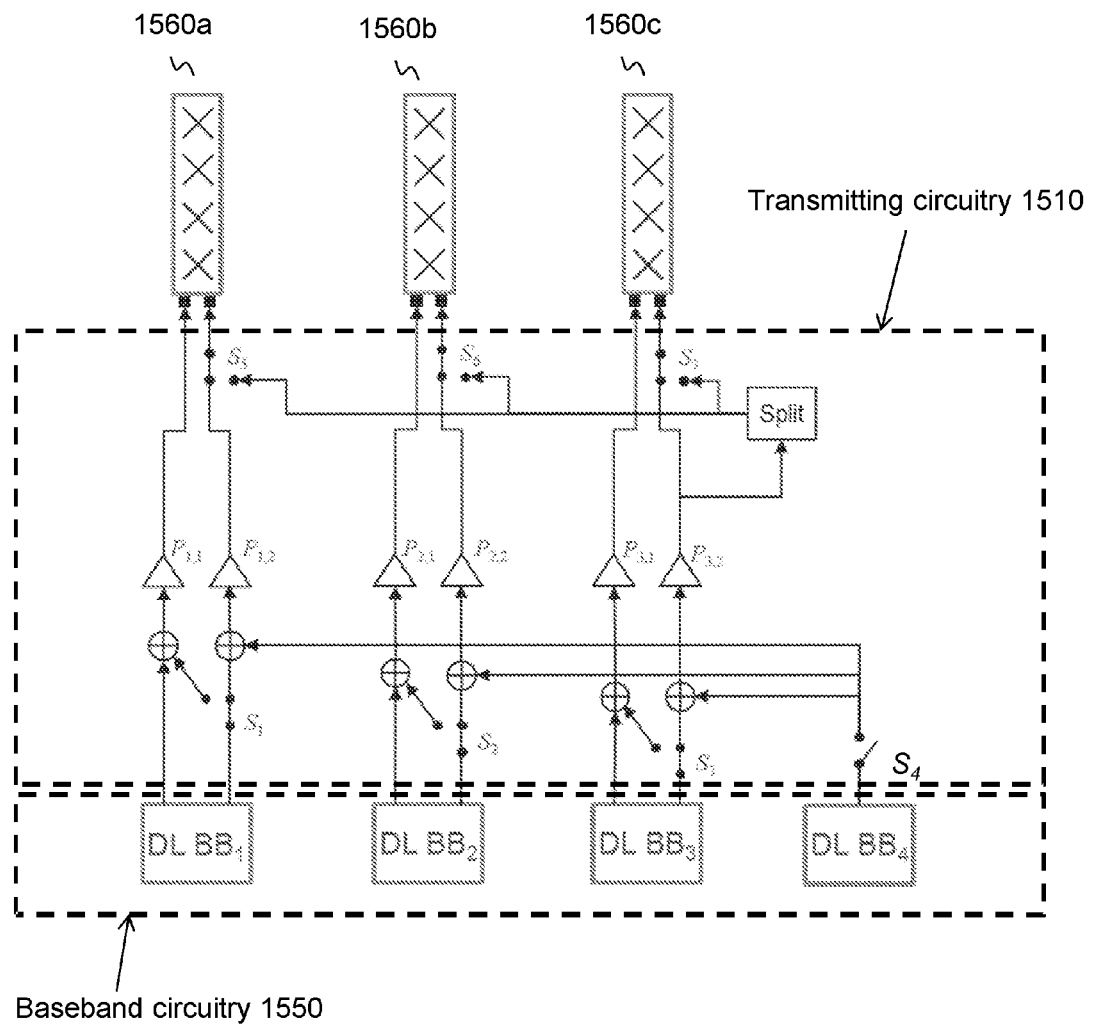

The network node 1100 comprises two or more power amplifiers (shown as $P_{1,1}$-$P_{3,2}$ in FIG. 4). In the first state, one power amplifier is amplifying the signal corresponding to the multi-sector cell ($P_{3,2}$ in FIG. 4). The signal corresponding to the multi-sector cell is inserted after the power amplifiers into antenna branches feeding the two or more antennas. Because the signal is split over several antennas, the power amplifier $P_{3,2}$ amplifying the signal corresponding to the multi-sector cell is using increased gain.

In this variant, the switching 1212 to the second state 1220 comprises turning on 1310 at least one additional power amplifier ($P_{1,1}$-$P_{3,1}$ in FIG. 4). The multi-sector cell signal is then redirected 1320 to pass through all the power amplifiers $P_{1,1}$-$P_{3,2}$. The gain of the power amplifier $P_{3,2}$ which was used for the multi-cell in the first state, can now be decreased to normal level. Furthermore, the sector cells are activated 1330, and the signals corresponding to the sector cells are amplified by at least one power amplifier each.

Switching from the second state to the third state comprises deactivating the multi-cell. Thus, in the third state 1230, the sector cells are active and each sector cell signal is amplified by a separate power amplifier ($P_{1,1}$-$P_{3,1}$ in FIG. 4).

Figure 14:
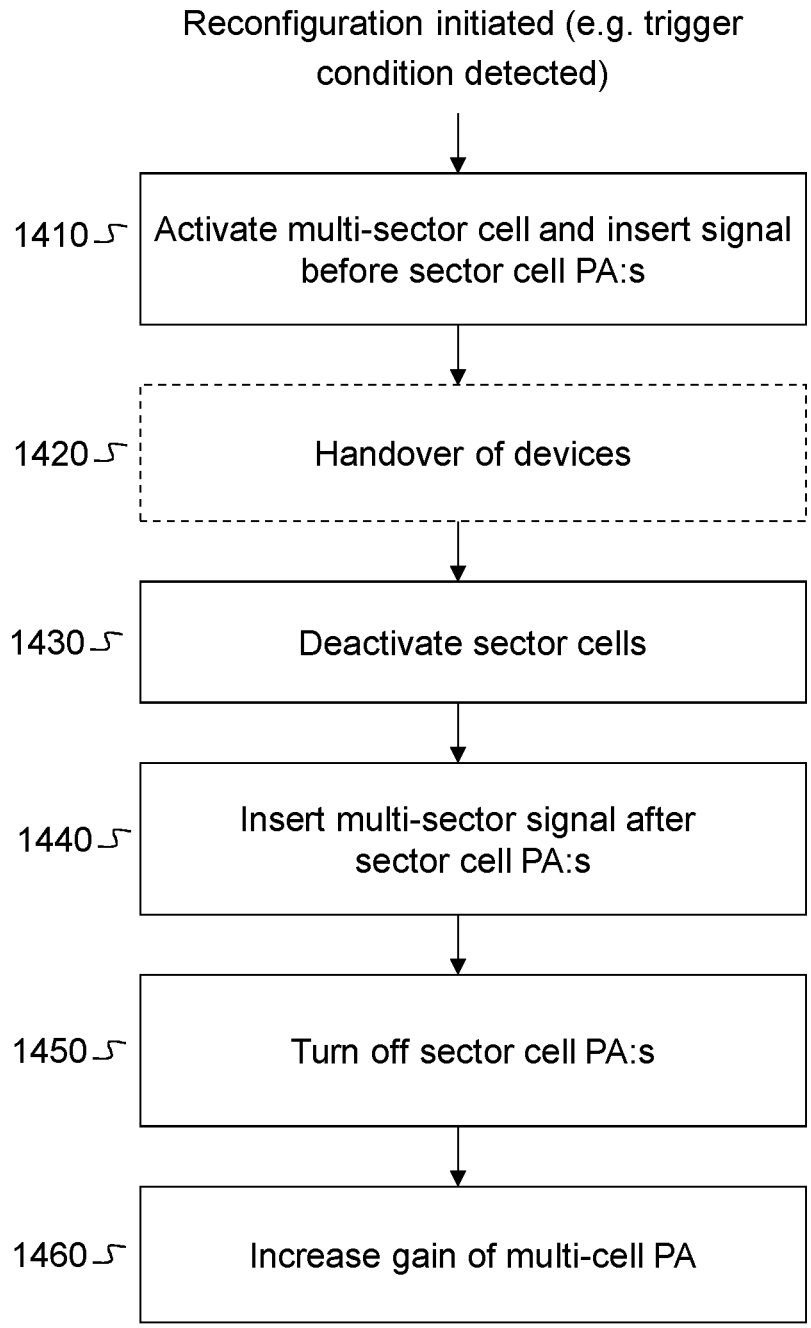
FIG. 14 is a flow chart illustrating a method according to some embodiments.

FIG. 14 is a flow chart illustrating the reverse process of reconfiguring from a sector cell state to a multi-cell state. The process described above with reference to FIG. 13 applies mutatis mutandis, but with the steps being performed in the reverse order. Reference is also made to the above description of sector-omni reconfiguration.

A further variant will now be described, wherein antenna merging is applied. Reference is once again made to FIG. 4, as well as the embodiment described in connection with FIG. 13.

As shown in FIG. 4, each signal corresponding to a sector cell is associated with two power amplifiers, which correspond to different physical antenna ports of the same antenna.

In this variant, the third state 1230 is a merged antenna state, where each signal corresponding to a sector cell is amplified by one of the two or more power amplifiers. This may be achieved by activating the switches $S_1$-$S_3$ in FIG. 4.

In the first state 1210, the signal corresponding to the multi-sector cell is amplified by one of the power amplifiers unused by the sector cells. In FIG. 4, $P_{3,2}$ is used for the multi-cell.

Figure 15:
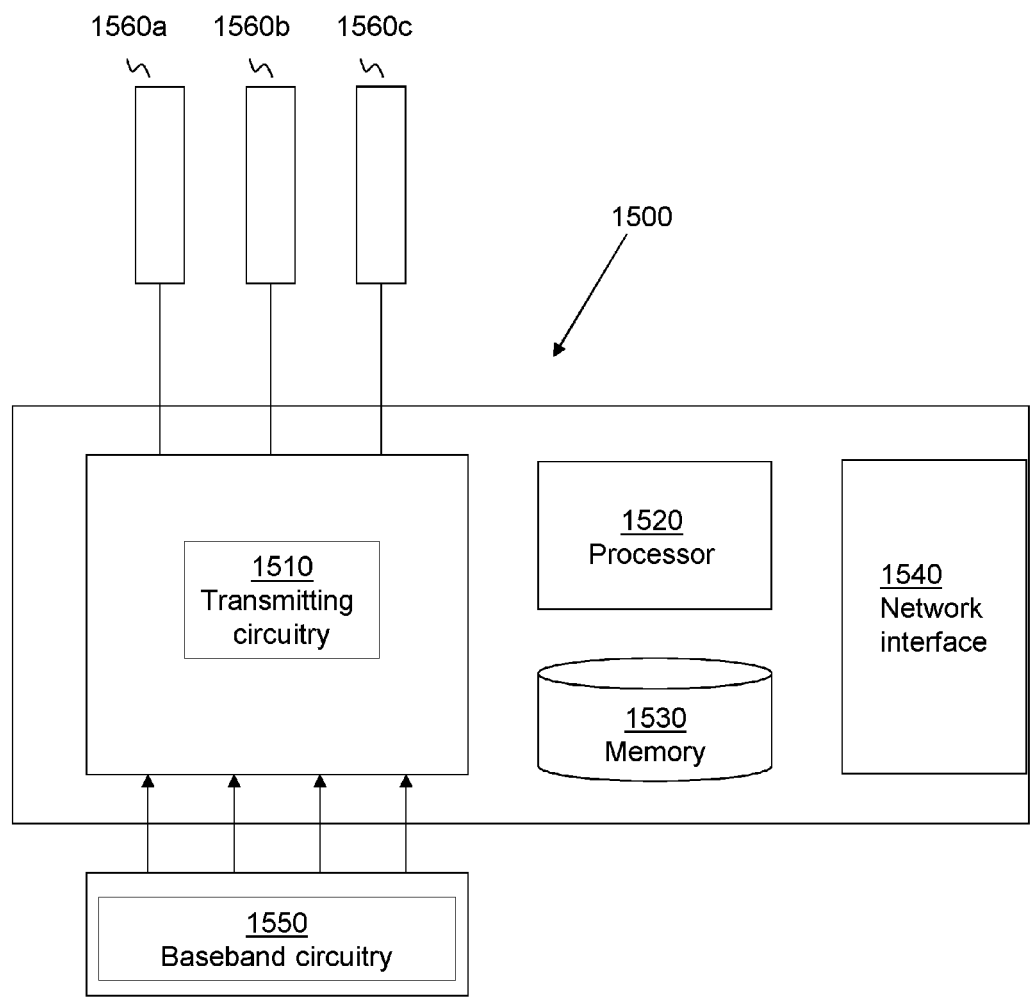
FIG. 15 is a block diagram illustrating a network node according to some embodiments.

A network node according to some embodiments will now be described with reference to FIG. 15. The network node 1500 is associated with at least two antennas 1560*a-c*, wherein each antenna 1560*a-c* is capable of transmitting a signal covering at least one sector. The network node may be a base station, e.g. an LTE eNodeB or a UTRAN NodeB.

The network node 1500 comprises transmitting circuitry 1510, a processor 1520, and a memory 1530. The network node 1500 is further connectable to baseband circuitry 1550 configured to generate baseband signals corresponding to one or more cells. The baseband circuitry 1550 may be part of the network node, but may also be located externally. The memory 1530 contains instructions executable by the processor 1520.

By execution of the instructions, the network node 1500 is operative to switch from a first state wherein a multi-sector cell is active, the multi-sector cell covering at least two sectors, to a second state, wherein sector cells covering each of the at least two sectors are active in addition to the multi-sector cell, and wherein the same antennas are utilized for the sector cells as for the multi-sector cell.

The network node is further operative to switch from the second state to a third state wherein the multi-sector cell is deactivated and the sector cells are active.

The network node may furthermore be operative to perform any of the method steps described above with reference to FIGS. 13 and 14.

In an example implementation, the transmitting circuitry 1510 may be configured as shown in FIG. 4. Two or more power amplifiers are arranged between the baseband circuitry 1550 and the antennas 1560a-c, such that there is at least one power amplifier per antenna, and each power amplifier is connectable to an antenna port associated with one of the antennas.

Furthermore, a first signal splitter (illustrated by the box marked "Split" in FIG. 4) is arranged after one of the power amplifiers and before the antennas 1560a-c. The first signal splitter is arranged to insert a signal into two or more antenna ports associated with different antennas.

The network node 1500 further comprises at least one switch ($S_5$-$S_7$) operable to connect or disconnect the first signal splitter. In a particular example, the network node 1500 is operative to connect the first signal splitter by means of the at least one switch ($S_5$-$S_7$) when in the first state, i.e. the multi-cell state. In other words, in the first state the multi-cell signal is inserted after the PA stage, and split over several antennas.

The network node 1500 further comprises a second signal splitter arranged between the baseband circuitry 1550 and the power amplifiers. The second signal splitter is arranged to direct a signal from the baseband circuitry 1550 into at least two power amplifiers connectable to two or more antenna ports associated with different antennas. In FIG. 4, this is illustrated by the signal from BB4 being added to the inputs of PAs $P_{1,2}$, $P_{2,2}$, and $P_{3,2}$. The network node 1500 further comprises a second switch $S_4$, operable to connect or disconnect the second signal splitter. In a particular example, the network node 1500 is operative to connect the second signal splitter by means of the second switch, and disconnect the first signal splitter by means of the first switch, when switching from the first state to the second state.

A variant of the example network node described above also implements antenna merging. In this variant, each antenna 1560a-c is associated with a first antenna port and with one or more additional antenna ports. Each antenna has a different first power amplifier associated with its first antenna port, and an additional power amplifier associated with each additional antenna port. The network node 1500 further comprises additional switches ($S_1$-$S_3$ in FIG. 4) associated with each antenna and operable to merge the two first antenna ports with the additional antenna ports. When the antenna ports are merged, the input to the additional power amplifiers associated with each antenna are redirected into the first power amplifier associated with the same antenna. For example, in FIG. 4, the input to $P_{1,2}$ is redirected into $P_{1,1}$ when switch $S_1$ is activated. The sector cell being transmitted from $BB_1$ will hence only use $P_{1,1}$. The first signal splitter is arranged to insert the signal into one or more of the first additional power amplifiers. That is to say, when the multi-cell signal is inserted before the PAs, the signal is inserted into a PA which is not used by any of the sector cells.

In a more general example, a network node 1500 is associated with at least two antennas 1560a-c, wherein each antenna is capable of transmitting a signal covering at least one sector. The network node 1500 comprises means adapted to switch from a first state wherein a multi-sector cell is active, the multi-sector cell covering at least two sectors, to a second state, wherein sector cells covering each of the at least two sectors are active in addition to the multi-sector cell, and wherein the same antennas are utilized for the sector cells as for the multi-sector cell. The network node 1500 further comprises means to switch from the second state to a third state wherein the multi-sector cell is deactivated and the sector cells are active.

It should be appreciated that embodiments described herein may be implemented in an LTE or UMTS network, as well as in any other type of network where network nodes may switch between sector cell and multi-sector cell configurations.

The embodiments set forth above are particularly suitable for implementation in the LTE coverage layer, but are not limited thereto.

The word "comprise" or "comprising" as used throughout this disclosure is intended to be interpreted as non-limiting, i.e. meaning "consist at least of".

The present invention is not limited to the embodiments described above. Various alternatives, modifications and equivalents will come to mind when reading the present disclosure. Therefore, the above embodiments should not be taken as limiting the scope of the invention, which is defined by the appended claims.

The invention claimed is:

1. A method for performing cell reconfiguration in a network node, the network node being associated with at least two antennas, wherein each antenna is capable of transmitting a signal covering at least one sector, the method comprising:
   switching from a first state wherein a multi-sector cell is active, the multi-sector cell covering at least two sectors,
   to a second state, wherein sector cells covering each of the at least two sectors are active in addition to the multi-sector cell, and wherein the same antennas are utilized for the sector cells as for the multi-sector cell,
   and switching from the second state to a third state wherein the multi-sector cell is deactivated and the sector cells are active.

2. The method of claim 1, wherein the network node comprises two or more power amplifiers, and wherein in the first state, one power amplifier is amplifying a signal corresponding to the multi-sector cell,
   and wherein switching to the second state comprises turning on at least one additional power amplifier, such that in the second and third states the signals corresponding to the sector cells are amplified by one power amplifier each.

3. The method of claim 2, wherein in the third state, each sector cell signal is amplified by a separate power amplifier, and wherein in the first state, the signal corresponding to the multi-sector cell is inserted after the separate power amplifiers into antenna branches feeding two or more antennas.

4. The method of claim 2, wherein in the third state, each signal corresponding to a sector cell is amplified by a separate power amplifier, and wherein in the first state, the signal corresponding to the multi-sector cell is amplified by one of the separate power amplifiers.

5. The method of claim 4, wherein switching from the first state to the second state comprises:
   redirecting the multi-sector cell signal to pass through one or more of the separate power amplifiers; and
   activating the sector cells.

6. The method of claim 4, wherein in the first state, the power amplifier amplifying the signal corresponding to the multi-sector cell is using increased gain, and wherein switching from the first state to the second state comprises decreasing the gain of that power amplifier to normal level.

7. The method of claim 1, wherein each signal corresponding to a sector cell is associated with two or more power amplifiers corresponding to different physical antenna ports of the same antenna, and wherein the third state is a merged antenna state where each signal corresponding to a sector cell is amplified by one of the two or more power amplifiers, and wherein in the first state, the signal corresponding to the multi-sector cell is amplified by one of the power amplifiers unused by the sector cells.

8. The method of claim 1, further comprising, when in the second state, adjusting the transmit power of the multi-sector cell and/or the transmit power of one or more sector cells, such that the difference between the signal strength of at least one of the sector cells and the signal strength of the multi-sector cell exceeds a handover threshold.

9. The method of claim 1, wherein in the first state, the multi-sector cell is serving one or more wireless devices, and wherein switching from the second state to the third state is performed after initiation or completion of handover of the wireless devices to the sector cells.

10. The method of claim 1, wherein switching from the first state to the second state is performed upon detecting, or receiving an indication of, high load in the multi-sector cell.

11. The method of claim 1, wherein the multi-sector cell is an omni cell.

12. The method of claim 1, wherein each cell is associated with a physical cell identity which is unique within the network node and within other nodes having a neighbor relation to the network node.

13. A network node associated with at least two antennas, wherein each antenna is capable of transmitting a signal covering at least one sector, the network node comprising transmitting circuitry, a processor, and a memory, the network node being connectable to baseband circuitry configured to generate baseband signals corresponding to one or more cells, the memory containing instructions executable by the processor whereby the network node is operative to:
switch from a first state wherein a multi-sector cell is active, the multi-sector cell covering at least two sectors,
to a second state, wherein sector cells covering each of the at least two sectors are active in addition to the multi-sector cell, and wherein the same antennas are utilized for the sector cells as for the multi-sector cell,
and switch from the second state to a third state wherein the multi-sector cell is deactivated and the sector cells are active.

14. The network node of claim 13, further comprising two or more power amplifiers arranged between the baseband circuitry and the antennas, such that there is at least one power amplifier per antenna, and each power amplifier is connectable to an antenna port associated with one of the antennas.

15. The network node of claim 13, further comprising a first signal splitter arranged after one of the power amplifiers and before the antennas, the first signal splitter being arranged to insert a signal into two or more antenna ports associated with different antennas.

16. The network node of claim 15, further comprising a switch operable to connect or disconnect the first signal splitter.

17. The network node of claim 16, wherein the network node is operative to connect the first signal splitter by means of the first switch when in the first state.

18. The network node of claim 15, further comprising a second signal splitter arranged between the baseband circuitry and the power amplifiers, the second signal splitter being arranged to direct a signal from the baseband circuitry into at least two power amplifiers connectable to two or more physical antenna ports associated with different antennas.

19. The network node of claim 18, further comprising a second switch operable to connect or disconnect the second signal splitter.

20. The network node of claim 19, wherein the network node is operative to connect the second signal splitter by means of the second switch, and disconnect the first signal splitter by means of the first switch, when switching from the first state to the second state.

21. The network node of claim 13, wherein each antenna is associated with a first antenna port and one or more additional antenna ports, and a first power amplifier is associated with the first antenna port and an additional power amplifier is associated with each additional antenna port, and further comprising additional switches associated with each antenna and operable to merge the first antenna port with the additional antenna ports, such that the input to the additional power amplifiers associated with each antenna are redirected into the first power amplifier associated with the same antenna, and wherein the first signal splitter is arranged to insert the signal into one or more of the additional power amplifiers.

22. A network node associated with at least two antennas, wherein each antenna is capable of transmitting a signal covering at least one sector, the network node comprising means adapted to:
switch from a first state wherein a multi-sector cell is active, the multi-sector cell covering at least two sectors,
to a second state, wherein sector cells covering each of the at least two sectors are active in addition to the multi-sector cell, and wherein the same antennas are utilized for the sector cells as for the multi-sector cell,
and switch from the second state to a third state wherein the multi-sector cell is deactivated and the sector cells are active.

23. The network node of claim 22, wherein the network node is a radio base station.

* * * * *